United States Patent [19]

Bauman

[11] 4,194,259
[45] Mar. 25, 1980

[54] ATTACHMENT MEANS FOR INDUSTRIAL PUSH BROOM HANDLES

[76] Inventor: John F. Bauman, 432 Redwood Ave., Redwood City, Calif. 94061

[21] Appl. No.: 937,048

[22] Filed: Aug. 28, 1978

[51] Int. Cl.² ............................................. B25G 3/24
[52] U.S. Cl. ...................................... 15/146; 15/177; 403/192
[58] Field of Search .................. 15/106, 111, 115–117, 15/145, 146, 148, 176, 177, 143, 144 R; 403/189–193

[56] References Cited

U.S. PATENT DOCUMENTS

| 428,696 | 5/1890 | Rolls | 15/116 R |
| 454,757 | 6/1891 | Newbaker | 15/143 R |
| 1,595,901 | 8/1926 | Mahler | 15/145 UX |
| 4,091,579 | 5/1978 | Giangivlio | 15/111 |

FOREIGN PATENT DOCUMENTS

| 52527 | 5/1910 | Switzerland | 15/148 |
| 186523 | 10/1922 | United Kingdom | 403/190 |

*Primary Examiner*—Peter Feldman
*Attorney, Agent, or Firm*—Julian Caplan

[57] ABSTRACT

A means to attach the back of a push broom to a handle comprises two angular members each having a first flange which is positioned face to face with the corresponding flange of the other member. The second flange of one member is screwed to the top of the broom back; the second flange of the other to the rear edge of the broom back. The face-to-face first flanges are clamped between two plates which have semi-cylindrical proximal ends received in the lower end of a connector tube. The handle is received in the upper end of the tube.

5 Claims, 2 Drawing Figures

ATTACHMENT MEANS FOR INDUSTRIAL PUSH BROOM HANDLES

This invention relates to a new and improved attachment means for industrial push broom handles.

Industrial push brooms comprise a detachable handle, a back and bristles projecting from the bottom surface of the back. Such brooms are subjected to hard usage, particularly in such uses as spreading asphalt during paving. A principal purpose of the present invention is to provide a means attaching the handle to the back which is not subject to breakage as has heretofore occurred.

Push brooms used in spreading asphalt and in working with other substances are frequently soaked in a solvent between uses and the solvent tends to weaken the handle and particularly the conventional attachment of the handle to the back of the broom. Such weakening is avoided in accordance with the present invention.

Another feature of the present invention is the ease with which the attachment means may be applied to the back of the push broom and also to the handle, thereby facilitating initial installation and also replacement.

A further feature of the invention is the fact that the attachment means are reuseable when a back or handle must be replaced, are very durable and are relatively inexpensive.

Other objects of the present invention will become apparent upon reading the following specification and referring to the accompanying drawings in which similar characters of reference represent corresponding parts in each of the several views.

Figure 1:
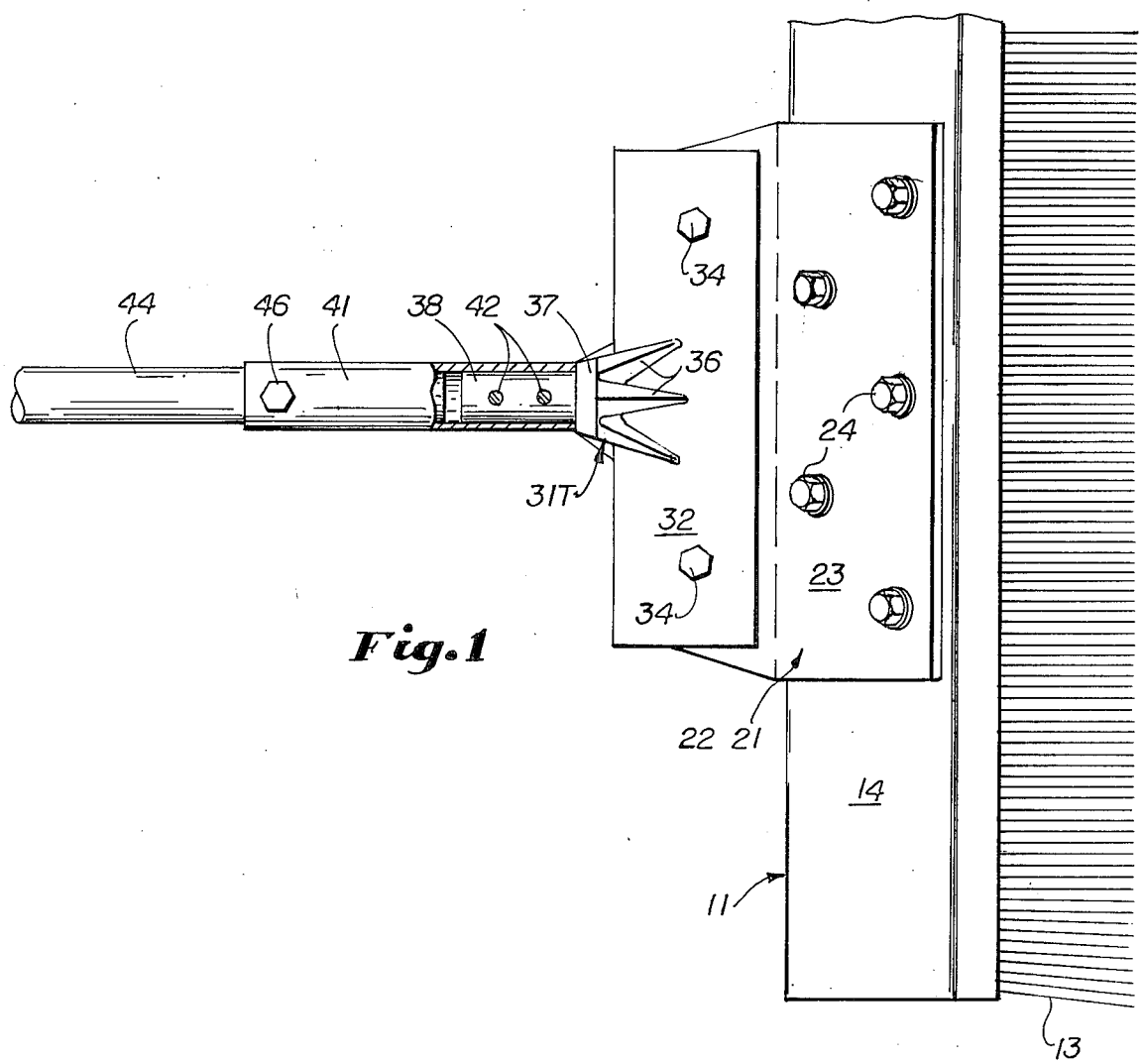
FIG. 1 is a top plan view of the present invention partially broken away in section to reveal internal construction and showing only portions of the broom back and handle.

Push broom back 11 is generally made of wood or composition material and is preferably rectangular. Projecting from the bottom 12 are bristles 13. The attachment means of the present invention engages the top face 14 and the rear edge 16 of back 11.

Figure 2:
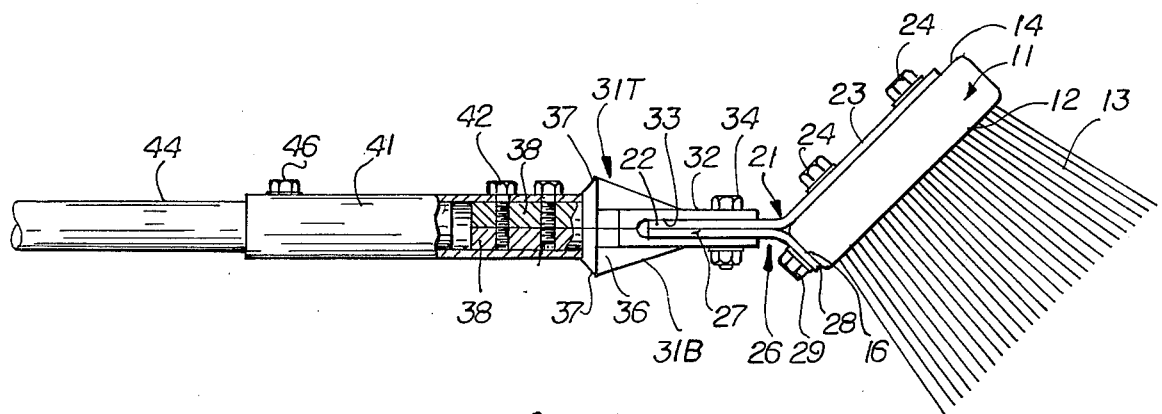
FIG. 2 is a side elevational view of the structure of FIG. 1, also partially broken away.

A first angular member 21 has a first flange 22 and a second flange 23 disposed at an obtuse angle of about 120° when viewed in side elevation or as in FIG. 2. Screws 24, which are preferably staggered in position, fasten flange 23 to top face 14. Second angular member 26 has a first flange 27 which is preferably of identical shape with flange 22 and is in face-to-face relationship therewith as best shown in FIG. 2, the flanges 22 and 27 being preferably fastened together by welding, rivets or similar means (not shown). Second flange 28 is at an obtuse angle of about 150° relative to flange 27. Flange 28 engages the rear edge 16 and is fastened thereto by screws 29.

The face-to-face flanges 22 and 27 are received in and engaged by a clamp consisting of identical clamp members 31T, 31B which are parted along a horizontal, longitudinal line as best shown in FIG. 2. Each member 31T, 31B has a plate 32 which overlies either flange 22 or 27, and the inner surface of plate 32 is formed with a relief 33 to provide room for said flanges. Bolts 34 clamp the flanges 22, 27 between the plates 32. Rearwardly expanding finger-like gussets 36 connect the plates 32 to semi-cylindrical ends 37. Rearward of ends 37 are reduced diameter semi-cylindrical ends 38.

A connecting sleeve 41 at its distal end receives reduced diameter semi-cylindrical ends 38 and is fastened thereto by bolts 42. A replaceable wooden handle 44 fits into the proximal end of sleeve 41 and is held in place by screw 46.

It will thus be seen that the means of attachment of handle 44 to back 11 is metallic. If the bristles 13 are dipped in solvent, the handle 44 is not affected by the solvent. Further, the back 11 or the handle 44 can conveniently be replaced if either or both require replacement. The attachment means of the present invention is very durable. Because it engages both the top 14 and the rear edge 16 of the back 11, despite hard usage it does not tend to snap off nor bend.

What is claimed is:

1. Attachment means to attach a handle to the back of a conventional push broom comprising a first member having a first flange fixed to the top face of said back, a second flange fixed to the back edge of said back and at least one upward-rearward extending broad, flat third flange, a clamp having first and second parts each being integral and rigid and having a plate and a proximal end, said third flange being rigidly clamped between said plates, and socket means secured to said proximal ends to receive an end of said handle.

2. Attachment means according to claim 1 having two said third flanges and in which said first member comprises two sections, one said section including said first flange and one said third flange disposed at an obtuse angle, the other said section including said second flange and the other said third flange disposed at an obtuse angle, said third flanges being face-to-face and substantially congruent.

3. Attachment means according to claim 1 in which said clamp part proximal ends are substantially semi-cylindrical and have reduced-diameter portions received in said socket means.

4. Attachment means according to claim 3 which further comprises converging gussets reinforcing said plates and said ends.

5. Attachment means according to claim 3 in which said socket means comprises a sleeve receiving said reduced-diameter portions.

* * * * *